(12) United States Patent
Cha

(10) Patent No.: US 8,271,032 B2
(45) Date of Patent: Sep. 18, 2012

(54) APPARATUS AND METHOD FOR MANAGING POWER CONSUMPTION IN A MOBILE COMMUNICATION DEVICE

(75) Inventor: Jung-Yoon Cha, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 388 days.

(21) Appl. No.: 12/652,247

(22) Filed: Jan. 5, 2010

(65) Prior Publication Data

US 2010/0173671 A1    Jul. 8, 2010

(30) Foreign Application Priority Data

Jan. 5, 2009    (KR) .................... 10-2009-0000303

(51) Int. Cl.
*H04M 1/00* (2006.01)
(52) U.S. Cl. ..................................... 455/556.1; 455/558

(58) Field of Classification Search .................. None
See application file for complete search history.

(56) References Cited

U.S. PATENT DOCUMENTS

2009/0156258 A1* 6/2009 Yang ............................ 455/558
2010/0009716 A1* 1/2010 Lee et al. ...................... 455/558

* cited by examiner

*Primary Examiner* — Erika Gary
(74) *Attorney, Agent, or Firm* — Cha & Reiter, LLC

(57) ABSTRACT

An apparatus and a method for measuring reception power of a base station in a mobile communication terminal having at least two Subscriber Identity Module (SIM) cards is disclosed. The apparatus includes a first terminal unit associated with a first SIM card and a terminal unit associated with each of the remaining at least two SIM cards. The first terminal unit measures a reception power of at least one base station when the mobile communication terminal operates in an idle mode. The terminal units associated with the remaining at least two SIM cards shares the reception power of the at least one base station measured by the first terminal unit.

18 Claims, 6 Drawing Sheets

APPARATUS AND METHOD FOR MANAGING POWER CONSUMPTION IN A MOBILE COMMUNICATION DEVICE

CLAIM OF PRIORITY

This application claims the benefit of the earlier filing date, under 35 U.S.C. §119(a), to that patent application filed in the Korean Intellectual Property Office on Jan. 5, 2009 and assigned Serial No. 10-2009-0000303, the entire disclosure of which is hereby incorporated by reference.

BACKGROUND OF THE INVENTION

1. Field of the Invention

The present invention relates to portable devices and more to an apparatus and a method for reducing current consumption occurring during an idle mode 2. Description of the Related Art A mobile communication device having a dual operational mode includes at least one terminal unit associated with each Subscriber Identity Module (SIM) card. That is, a mobile communication terminal having a dual operational mode includes a first terminal unit for a first SIM card and a second terminal unit for a second SIM card that are integrated into one unit. The first terminal unit and the second terminal unit share only data related to a user interface, but operate independently. Here, the terminal unit includes at least one module for performing communication.

When operating in an idle mode, a mobile communication device measures reception power of a serving base station and at least one neighbor base station. The first terminal unit and the second terminal unit each measure the reception power of the serving base station and the at least one neighbor base station independently. Therefore, when the mobile communication device having a dual SIM card operates in an idle mode, current consumption increases compared to a mobile communication terminal having only one terminal unit, as each mode performs essentially the same operation.

SUMMARY OF THE INVENTION

An aspect of the present invention is to provide an apparatus and a method for reducing current consumption in a mobile communication terminal having a dual SIM card.

Another aspect of the present invention is to provide an apparatus and a method for reducing current consumption occurring while a mobile communication device having a dual SIM card operates in an idle mode.

Still another aspect of the present invention is to provide an apparatus and a method for operating only a terminal unit for one SIM card in the case where a mobile communication terminal having a dual SIM card operates in an idle mode.

Yet another aspect of the present invention is to provide an apparatus and a method for reducing current consumption by allowing at least two terminal units forming a mobile communication terminal having a dual SIM card to share reception power information of a serving base station and neighbor base stations.

In accordance with an aspect of the present invention, an apparatus for measuring reception power of a base station in a mobile communication terminal having at least two Subscriber Identity Module (SIM) cards is provided. The apparatus includes a first terminal unit containing a first SIM card, for measuring reception power of at least one base station when the mobile communication terminal operates in an idle mode, and at least one additional terminal unit containing a corresponding at least one SIM card, for sharing the reception power of the at least one base station measured by the first terminal unit.

In accordance with another aspect of the present invention, a method for measuring reception power of a base station in a mobile communication terminal having at least two Subscriber Identity Module (SIM) cards is provided. The method includes, when the mobile communication terminal operates in an idle mode, measuring reception power of at least one base station using a first terminal unit, and transmitting reception power of the at least one base station measured by the first terminal unit to at least one additional terminal unit.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

The following description, with reference to the accompanying drawings, is provided to assist in a comprehensive understanding of exemplary embodiments of the invention as defined by the claims and their equivalents. It includes various specific details to assist in that understanding but these are to be regarded as merely exemplary.

Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a technique for reducing current (power) consumption in a mobile communication terminal having a dual SIM card.

Figure 1:
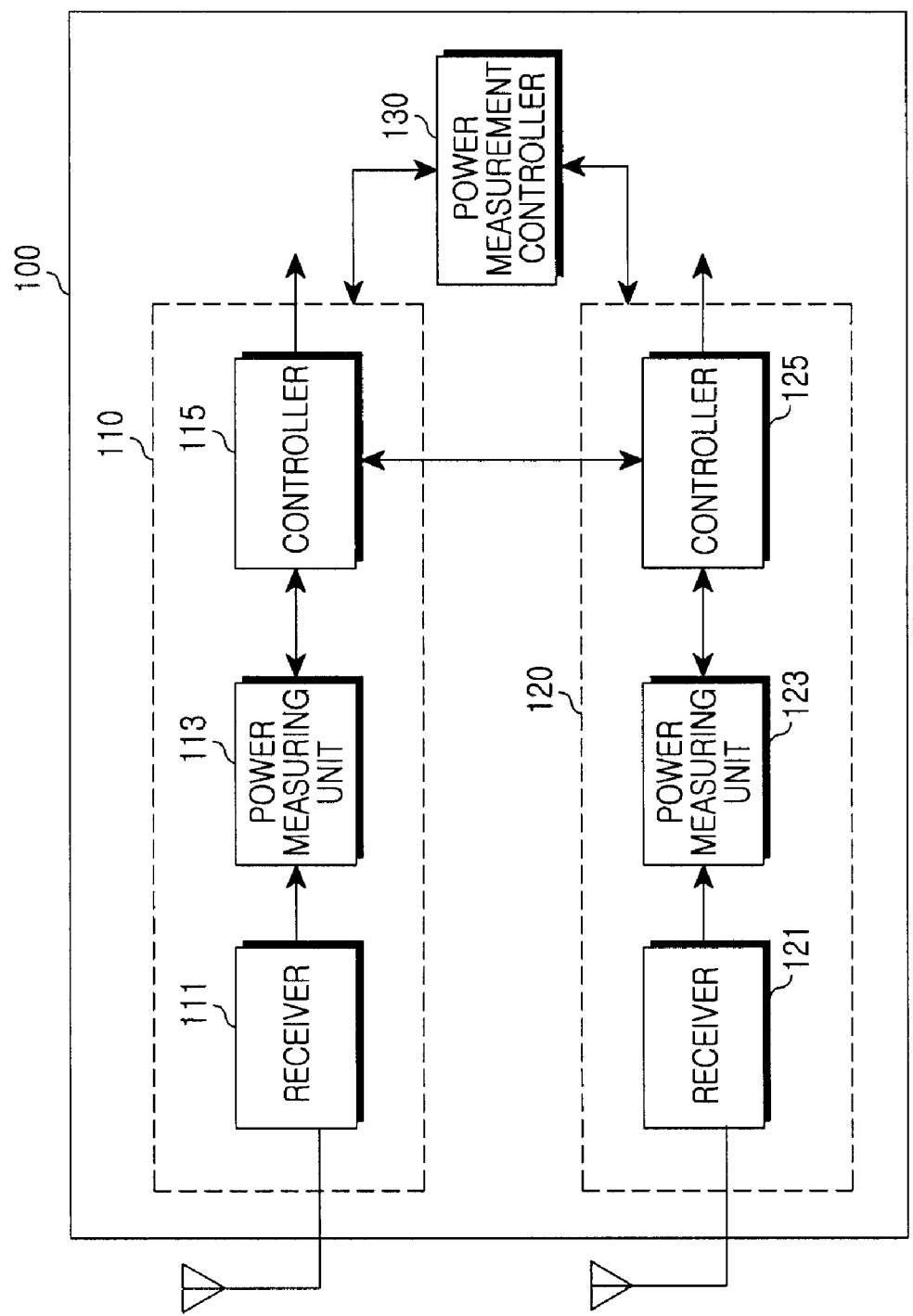
FIG. 1 is a block diagram illustrating a mobile communication terminal supporting a dual SIM card according to an exemplary embodiment of the present invention.

A typical mobile communication terminal having a dual SIM card has the construction illustrated in FIG. 1.

FIG. 1 is a block diagram illustrating a mobile communication terminal supporting a dual SIM card according to an exemplary embodiment of the present invention.

Referring to FIG. 1, the mobile communication terminal 100 includes a first terminal unit 110 supporting a first SIM card, a second terminal unit 120 supporting a second SIM card, and a power measurement controller 130. Since the first terminal unit 110 and the second terminal unit 120 have the same construction, description of the construction of the second terminal unit 120 is omitted.

The first terminal unit 110 includes a receiver 111, a power measuring unit 113, and a controller 115. Although not shown it would be recognized that the controller may include one or more processing units that may be in communication with one or more storage units. The storage units may be internal or external to the one or more processing units.

The receiver 111 converts a Radio Frequency (RF) signal received via an antenna (not labeled) into a baseband signal. At this point, when the mobile communication terminal 100 operates in an idle mode, the receiver 111 is driven under control of the controller 115.

The power measuring unit 113 measures reception power of a serving base station using a signal received from the serving base station via the receiver 111. In addition, the power measuring unit 113 measures reception power of each neighbor base station using a signal received from at least one neighbor base station via the receiver 111. At this point, when the mobile communication terminal 100 operates in the idle mode, the power measuring unit 113 is driven under control of the controller 115.

When the mobile communication terminal 100 operates in the idle mode, the controller 115 controls driving of the receiver 111 and the power measuring unit 113 under control of the power measurement controller 130. For example, in the case where the power measurement controller 130 sets the first terminal unit 110 as a master module, the controller 115 activates the receiver 111 and the power measuring unit 113. As another example, in the case where the power measurement controller 130 sets the first terminal unit 110 as a slave module, the controller 115 inactivates the receiver 111 and the power measuring unit 113. At this point, the controller 115 may inactivate only the power measuring unit 113.

When the receiver 111 and the power measuring unit 113 are activated, the controller 115 transmits reception power information of a serving base station and a neighbor base station provided from the power measuring unit 113 to the second terminal unit 120. For example, the controller 115 periodically transmits the reception power information of the serving base station and the neighbor base station to a controller 125 of the second terminal unit 120. As another example, when reception power of the serving base station and the neighbor base station changes, the controller 115 transmits the reception power of the serving base station and the neighbor base station to the controller 125 of the second terminal unit 120.

When the receiver 111 and the power measuring unit 113 are inactivated, the controller 115 receives reception power information of the serving base station and the neighbor base station from the second terminal unit 120.

When the power measurement controller 130 sets the first terminal unit 110 as a slave module but a disorder of the second terminal unit 120 is detected, the controller 115 activates the receiver 111 and the power measuring unit 113. For example, when an error occurred signal is received from the second terminal unit 120, (i.e., a disorder) the controller 115 recognizes that a disorder has occurred at the second terminal unit 120. For another example, when reception power information of a base station is not received for a reception power transmission period from the second terminal unit 120, the controller 115 may recognize a disorder has occurred to the second terminal unit 120.

When the mobile communication terminal 100 switches to the idle mode, the power measurement controller 130 determines a master module for measuring reception power of a serving base station and a neighbor base station among the first terminal unit 110 and the second terminal unit 120. For example, the power measurement controller 130 compares electric field strengths of the first terminal unit 110 and the second terminal unit 120 to determine a master module. Although not shown it would be recognized that the controller 130 may include one or more processing units that may be in communication with one or more storage units. The storage units may be internal or external to the one or more processing units. In addition, the storage units of processor 130 may be shared with the processors of controllers 115 and 125. That is, the storage units may be dual-port memories that may be accessed by the processors of controllers 115 and 125.

In the above-described exemplary embodiment of the present invention, when switching to the idle mode, the mobile communication terminal determines a master module for measuring reception power of a serving base station and neighbor base stations.

In an exemplary embodiment of the present invention, the mobile communication terminal may fix one of the first terminal unit 110 and the second terminal unit 120 as a master module. In this case, the mobile communication terminal does not include the power measurement controller 130.

As described above, when a mobile communication terminal having a dual SIM card operates in the idle mode, the mobile communication terminal activates only a terminal unit set as a master module. Accordingly, the terminal unit set to the master module measures reception power of a serving base station and a neighbor base station as illustrated in FIG. 2.

Figure 2:
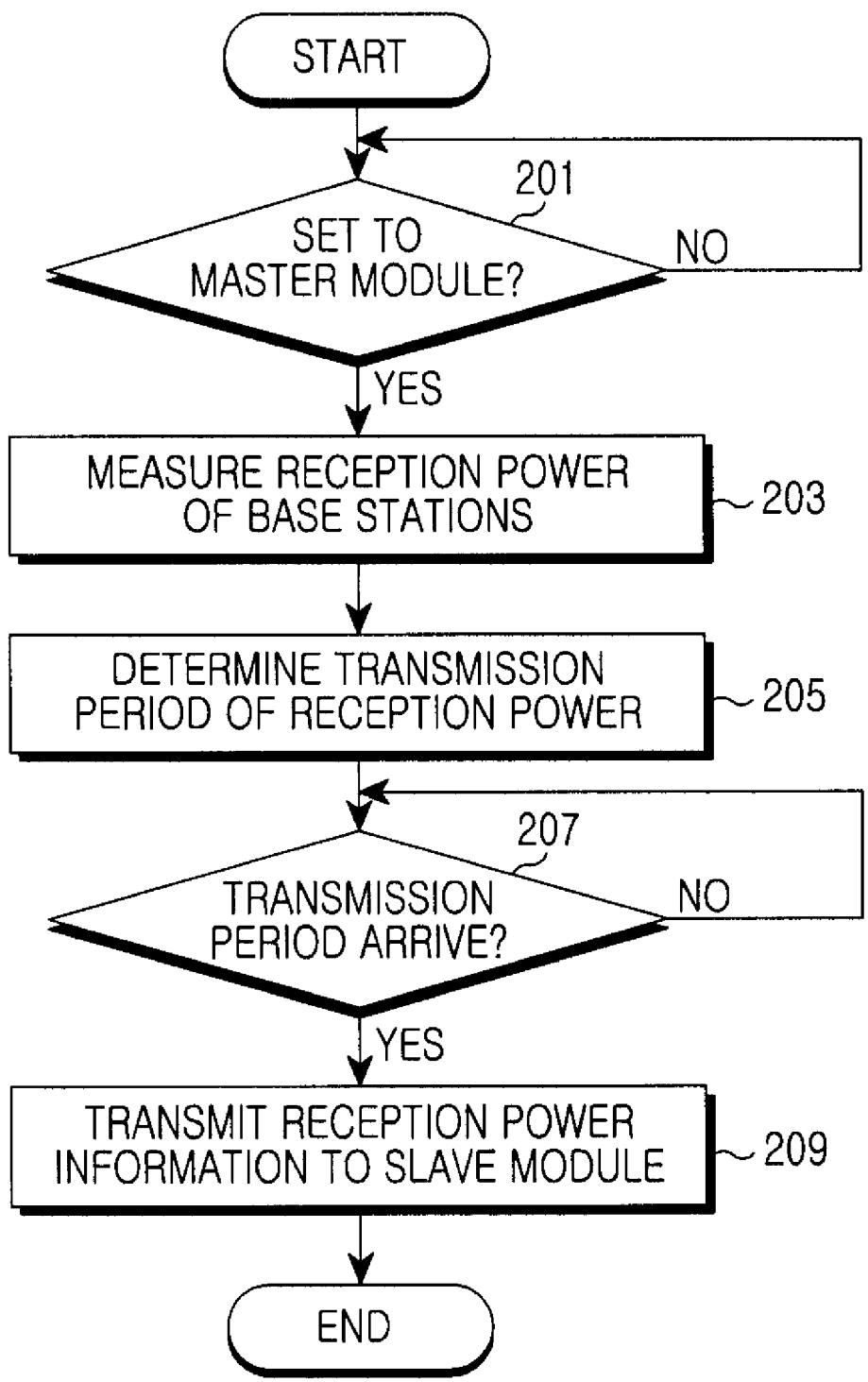
FIG. 2 is a flowchart for measuring reception power at a terminal unit set as a master module of a mobile communication terminal according to an exemplary embodiment of the present invention.

FIG. 2 is a flowchart for measuring reception power at a terminal unit set as a master module of a mobile communication terminal according to an exemplary embodiment of the present invention.

Referring to FIG. 2, the terminal unit determines whether the terminal unit is set as the master module in step 201.

When set as the master module, the terminal unit measures reception power of a serving base station and at least one neighbor base station using signals received from the serving base station and the at least one neighbor base station in step 203. For example, the terminal unit periodically measures reception power of the serving base station and the neighbor base station. At this point, the terminal unit stores the measured reception power of the serving base station and the neighbor base station in a storing unit.

After measuring the reception power of the serving base station and the neighbor base station, the terminal unit determines a transmission period of reception power information in step 205. Here, the transmission period of the reception power information may be or may not be the same as a period at which the terminal unit determines reception power.

The terminal unit determines whether the transmission period of the reception power information (determined in step 205) arrives in step 207 which means that a time of transmission has arrived.

When the transmission period of the reception power information arrives the terminal unit transmits the reception power of the serving base station and the neighbor base station (measured in step 203) to a terminal unit set to a slave module in step 209.

After that, the terminal unit ends the present algorithm.

Figure 3:
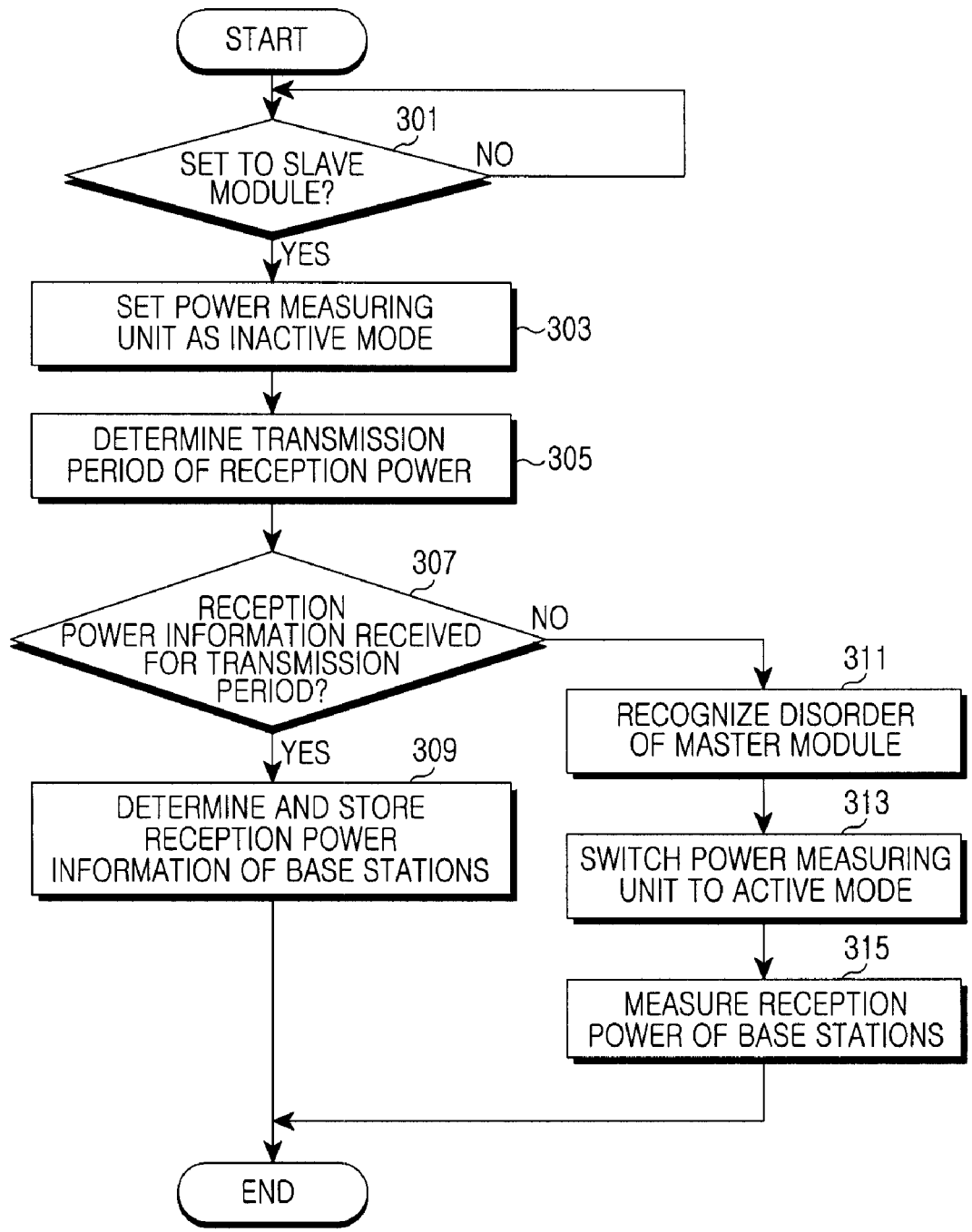
FIG. 3 is a flowchart for receiving reception power information from a terminal unit set as a master module to a terminal unit set as a slave module of a mobile communication terminal according to an exemplary embodiment of the present invention.

As described above, in the case where a terminal unit set as a master module transmits reception power of a serving base station and a neighbor base station, a terminal unit set to a slave module determines reception power of the serving base station and the neighbor base station as illustrated in FIG. 3. In the following description, it is assumed that the terminal unit set as the slave module recognizes a disorder of the terminal unit set as the master module depending on whether reception power information of a base station is received from the terminal unit set as the master module at a reception power transmission period.

FIG. 3 is a flowchart for receiving reception power information from a terminal unit set as a master module at a terminal unit set as a slave module of a mobile communication terminal according to an exemplary embodiment of the present invention. Referring to FIG. 3, the terminal unit determines whether the terminal unit has been set as the slave module in step 301.

When the terminal has been set as the slave module, the terminal unit inactivates at least one of a receiver and a power measuring unit in step 303. For example, the terminal unit may inactivate only the power measuring unit. For another example, the terminal unit may inactivate both the receiver and the power measuring unit.

After switching to an inactive mode, the terminal unit determines a transmission period of reception power information in step 305.

The terminal unit determines whether reception power information of a base station is received from the terminal unit set as the master module at the transmission period (determined in step 305) in step 307. Here, the reception power information of the base station includes reception power information of a serving base station and at least one neighbor base station.

When the reception power information of the base station is received at the transmission period of the reception power information, the terminal unit determines reception power of the serving base station and the at least one neighbor base station measured by the terminal unit set as the master module in step 309. At this point, the terminal unit stores the reception power of the serving base station and the at least one neighbor base station provided by the terminal unit set as the master module in a storing unit as if the terminal unit set as the slave module measured the reception power.

When the transmission period of the reception power information arrives but the reception power information of the base station is not received, the terminal unit recognizes a disorder has occurred to the terminal unit set as the master module in step 311. In one aspect of the invention, a disorder may be determined based on no power being received. In another aspect of the invention, a disorder may be determined based on the received power being less than a known threshold value.

The terminal unit activates the inactivated module (in step 303) in step 313. For example, the terminal unit activates the power measuring unit inactivated (in step 303). For another example, the terminal unit may activate both the receiver and the power measuring unit inactivated (in step 303).

After switching the inactivated module to an active mode, the terminal unit measures reception power of a serving base station and at least one neighbor base station using signals provided from the serving base station and the at least one neighbor base station in step 315. For example, the terminal unit periodically measures the reception power of the serving base station and the neighbor base station. At this point, the terminal unit stores the measured reception power of the serving base station and the neighbor base station in a storing unit.

After that, the terminal unit ends the present algorithm.

Figure 4:
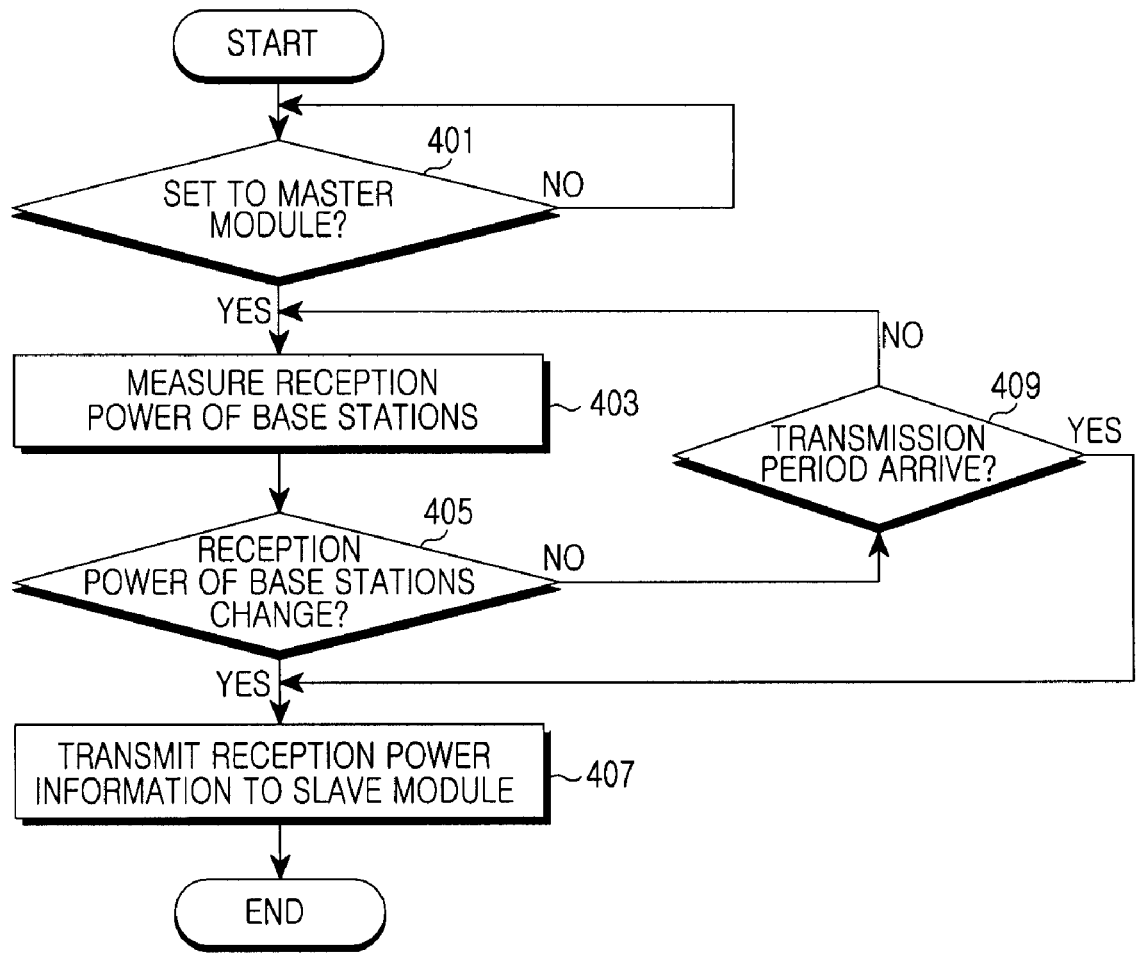
FIG. 4 is a flowchart illustrating a procedure for measuring reception power in a terminal unit set as a master module of a mobile communication terminal according to an exemplary embodiment of the present invention.

The terminal unit set as the master module may measure reception power as illustrated in FIG. 4.

FIG. 4 is a flowchart illustrating a procedure for measuring reception power in a terminal unit set to a master module of a mobile communication terminal according to an exemplary embodiment of the present invention.

Referring to FIG. 4, the terminal unit determines whether the terminal unit has been set as the master module in step 401.

When set as the master module, the terminal unit measures reception power of a serving base station and at least one neighbor base station using signals received from the serving base station and the at least one neighbor base station in step 403. In one aspect of the invention, the terminal unit periodically measures reception power of the serving base station and the neighbor base station. The terminal unit may store the measured reception power of the serving base station and the neighbor base station in a storing unit after each measurement (not shown).

After measuring the reception power of the serving base station and the neighbor base station, the terminal unit compares the reception power of the base stations determined in step 403 with previously determined reception power of the base stations to determine whether the reception power of the base stations has changed in step 405.

When the reception power of the base stations has changed, the terminal unit transmits the reception power of the serving base station and the at least one neighbor base station determined in step 403 to a slave module in step 407.

However, when the reception power of the base stations has not changed, the terminal unit determines whether a transmission period of reception power information arrives in step 409. Here, the transmission period of the reception power information may be or may not be the same as a period at which the terminal unit determines reception power.

When the transmission period of the reception power information does not arrive, the terminal unit again determines the reception power of the signals transmitted by each of the serving base station and the neighbor base station in step 403.

In contrast, when the transmission period of the reception power information arrives, the terminal unit transmits reception power of the serving base station and the at least one neighbor base station determined in step 403 to the slave module in step 407. That is, even when the reception power of the base stations does not change, the terminal unit transmits the reception power information of the base stations to a terminal unit set to the slave module each time a measurement is attempted. Thus, when the measurement of received power is performed periodically, a measurement is provided to slave station whether a measurement has been performed within the time period (window) of measurement or not.

After that, the terminal unit ends the present algorithm.

Figure 5:
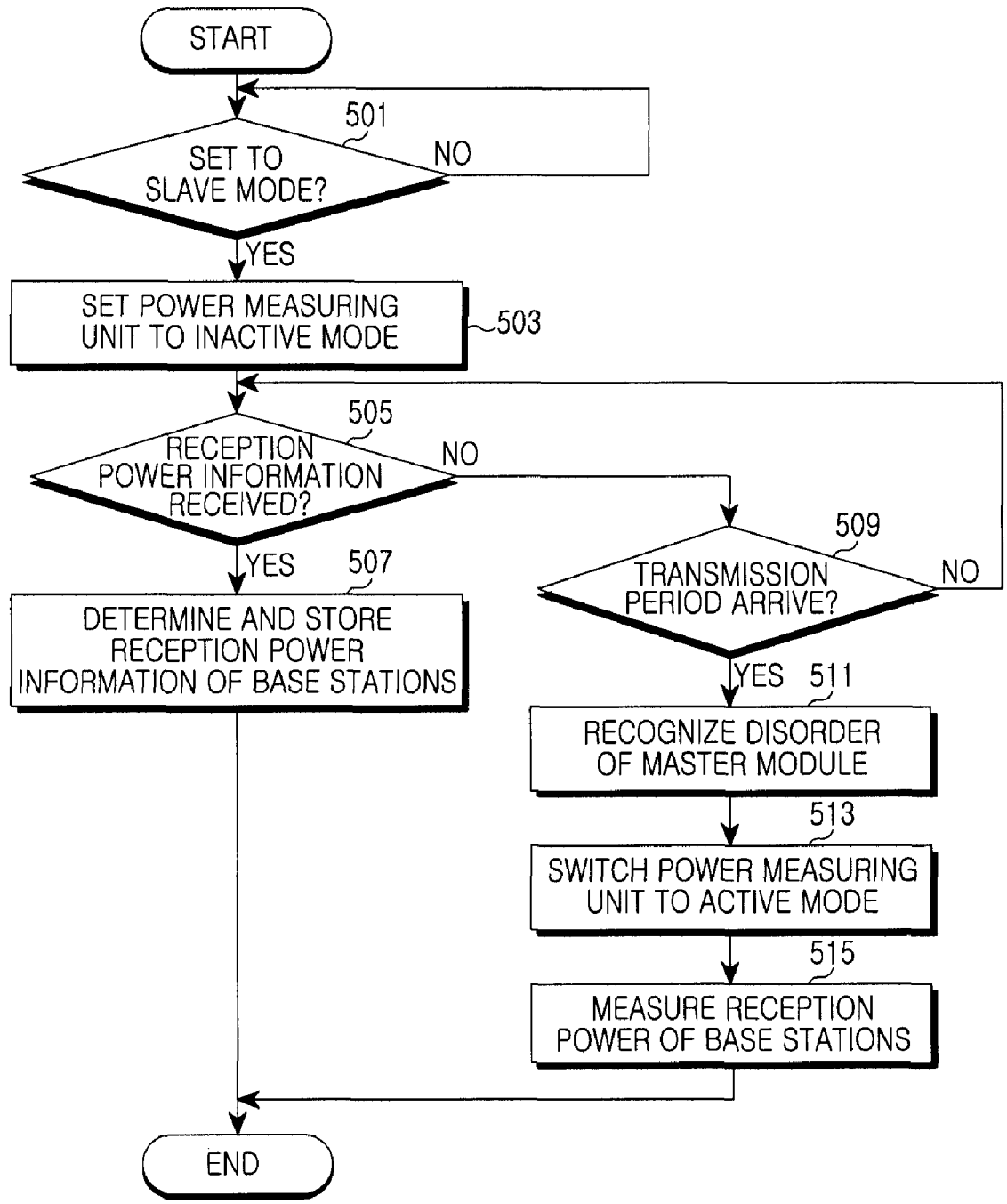
FIG. 5 is a flowchart illustrating a procedure for receiving reception power information from a terminal unit set as a master module to a terminal unit set as a slave module of a mobile communication terminal according to an exemplary embodiment of the present invention.

As described above, when a terminal unit set as a master module transmits reception power of a serving base station and at least one neighbor base station to the slave module, the terminal unit set as the slave module determines the reception power of the serving base station and the neighbor base station as illustrated in FIG. 5.

In the following description, it is assumed that the terminal unit set as the slave module recognizes a disorder of the terminal unit set as the master module depending on whether reception power information of a base station is received from the terminal unit set as the master module at a reception power transmission period.

FIG. 5 is a flowchart illustrating a procedure for receiving reception power information from a terminal unit set as a master module at a terminal unit set as a slave module of a mobile communication terminal according to an exemplary embodiment of the present invention.

Referring to FIG. 5, the terminal unit determines whether the terminal unit has been set as a slave module in step 501.

When set as the slave module, the terminal unit inactivates at least one of a receiver and a power measuring unit in step 503. For example, the terminal unit may only inactivate the power measuring unit. In another aspect of the invention, the terminal unit may inactivate both the receiver and the power measuring unit.

The slave terminal unit determines whether reception power information of a base station is received from a terminal unit set as a master module in step 505. Here, the reception power information of the base station includes reception power information of a serving base station and at least one neighbor base station.

When the reception power information of the base station is received, the slave terminal unit determines the reception power of the serving base station and the at least one neighbor base station measured by the terminal unit set as the master module in step 507. if the answer is in the affirmative, the slave terminal unit stores the reception power of the serving base station and the at least one neighbor base station provided by the terminal unit set as the master module in a storing unit as if the terminal set as the slave module measured the reception power itself.

However, when the reception power information of the base station is not received, the terminal unit determines whether a period of reception power information arrives in step 509.

When the period of reception power information does not arrive, the slave terminal unit returns to step 505 to determine whether reception power information of the base stations has been received from the terminal unit set as the master module.

However, when the period of reception power information arrives the terminal unit recognizes that a disorder has occurred to the master module in step 511. In one aspect of the invention, a disorder may be determined based on no power being received. In another aspect of the invention, a disorder may be determined based on the received power being less than a known threshold value.

In this case, the slave terminal unit activates the module(s) inactivated in step 503 in step 513. For example, the terminal unit activates the inactivated power measuring unit (in step 503). For another example, the terminal unit activates both the receiver and the power measuring unit if both units have been inactivated.

After activating the inactivated module(s), the terminal unit measures reception power of the serving base station and the neighbor base station using signals transmitted from the serving base station and the neighbor base station in step 515. In one aspect, the terminal unit periodically measures the reception power of the serving base station and the neighbor base station. At this point, the terminal unit stores the measured reception power in a storing unit (not shown).

After that, the terminal unit ends the present algorithm.

In the above-described exemplary embodiment of the present invention, the terminal unit set as the slave module recognizes a disorder of the terminal unit set as the master module depending on whether reception power information of the base station is received from the terminal unit set to the master module.

In another aspect of the present invention, a terminal unit set as a master module may transmit an "error occurred" information to a terminal unit set as a slave module when a disorder of the terminal set to the master module is recognized. In this case, the terminal unit set to the slave module may operate as illustrated in FIG. 6.

Figure 6:
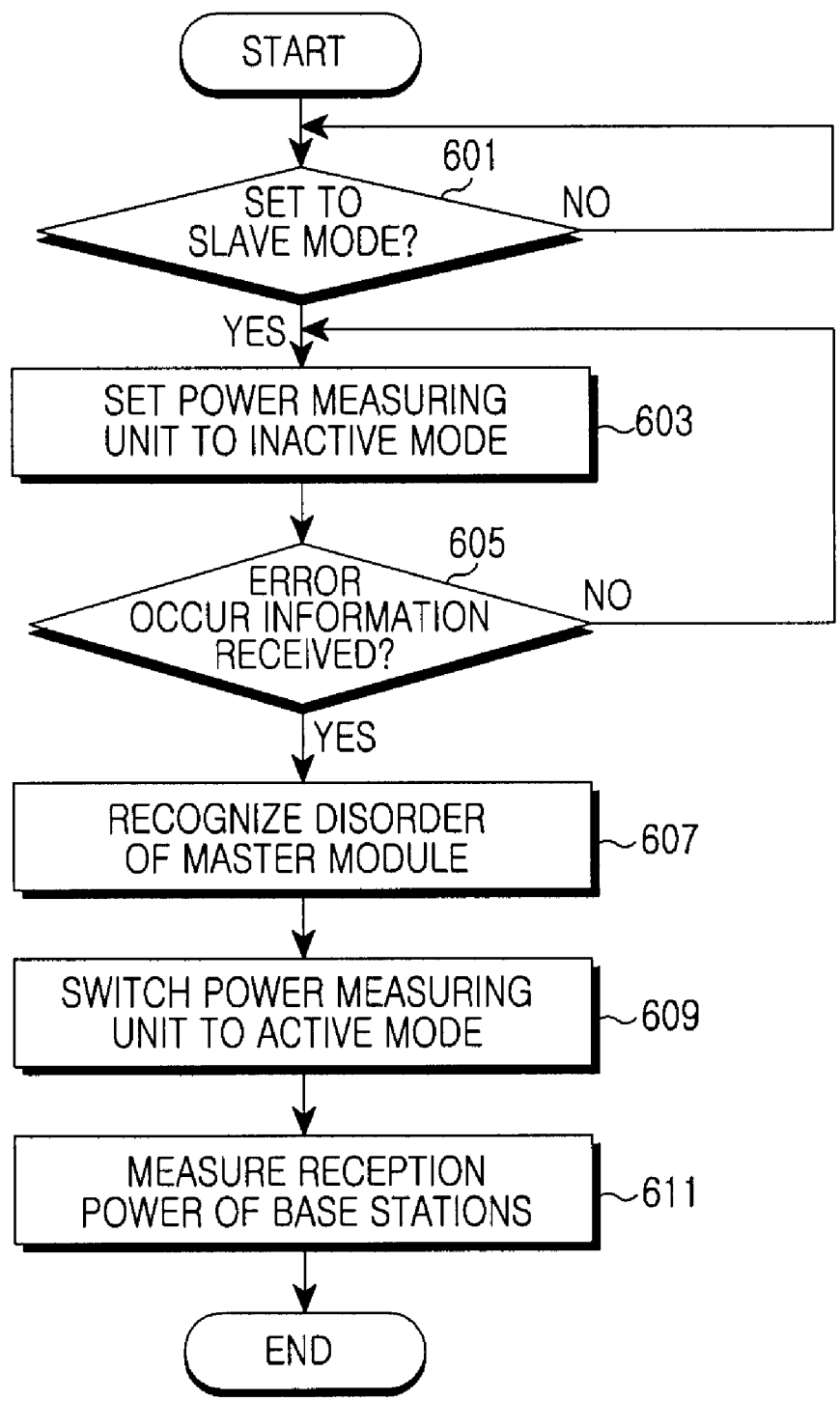
FIG. 6 is a flowchart for measuring reception power at a terminal unit set as a slave module of a mobile communication terminal according to an exemplary embodiment of the present invention.

FIG. 6 is a flowchart for measuring reception power at a terminal unit set as a slave module of a mobile communication terminal according to an exemplary embodiment of the present invention.

Referring to FIG. 6, the terminal unit determines whether the terminal unit has been set as a slave module in step 601.

When set as the slave module, the terminal unit inactivates at least one of a receiver and a power measuring unit in step 603, as previously describe.

The terminal unit determines whether "error occurred" information has been received from a terminal unit set as a master module in step 605.

When the "error occurred" information is not received, the terminal unit stands by in order to receive reception power information of a base station transmitted by the terminal unit set as the master module.

However, when the "error occurred" information is received, the terminal unit recognizes a disorder has occurred to the terminal unit set as the master module in step 607.

The terminal unit activates the inactivated module(s) in step 609, as previously described. Although not shown, it would be recognized that when the inactivated module is activated, the active module is inactivated.

After activating the inactivated module(s) the terminal unit measures reception power of the serving base station and the neighbor base station using signals transmitted from the serving base station and the neighbor base station in step 611. For example, the terminal unit periodically measures the reception power of the serving base station and the neighbor base station. At this point, the terminal unit stores the measured reception power in a storing unit.

After that, the terminal unit ends the present algorithm.

In the above-described exemplary embodiment of the present invention, a mobile communication terminal has two SIM cards. However, exemplary embodiments of the present invention are applicable to a mobile communication terminal having two or more SIM cards. For example, in the case where a mobile communication terminal has three SIM cards, the mobile communication terminal sets a terminal unit for one SIM card as a master module and sets terminal units for the other two SIM cards as slave modules. When an error occurs in the terminal unit set as the master module, the mobile communication terminal may measure reception power of base stations using one or both of the two terminal units set as the slave modules. At this point, the mobile communication terminal may set one of the two terminal units set as the slave modules, to the master module.

As described above, in the case where a mobile communication terminal having a dual SIM card operates in an idle mode, terminal units for respective SIM cards share reception power information of a serving base station and neighbor base stations, so that current consumption can be reduced.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for managing reception power of a base station in a mobile communication terminal having at least two Subscriber Identity Module (SIM) cards, the apparatus comprising:
   a first terminal unit for a first SIM card, for measuring reception power of at least one base station when the mobile communication terminal operates in an idle mode; and
   at least one other terminal unit for at least one SIM card that excludes the first SIM card, for sharing the reception power of the at least one base station measured by the first terminal unit, wherein the first terminal unit measures reception power of a serving base station and at least one neighbor base station and provides the measured information to each of the at least one other terminal units.

2. The apparatus of claim 1, wherein the first terminal unit periodically transmits the measured reception power of the at least one base station to each of the at least one other terminal units.

3. The apparatus of claim 1, wherein when the reception power of the at least one base station changes, the first terminal unit transmits the changed reception power of the at least one base station to each of the at least one other terminal units.

4. The apparatus of claim 1, wherein the first terminal unit comprises:
   a receiver for receiving a signal;
   a power measuring unit for measuring the reception power of the at least one base station; and
   a controller for controlling driving of the receiver and the power measuring unit,
   wherein, when the first terminal unit measure the reception power of the at least one base station, the controller activates the receiver and the power measuring unit, and when the first terminal unit does not measure the reception power of the at least one base station, the controller inactivates at least one of the receiver and the power measuring unit.

5. The apparatus of claim 1, wherein when a transmission period of reception power arrives and the reception power of the at least one base station is not received from the first terminal unit, the at least one other terminal unit measures the reception power of the at least one base station.

6. The apparatus of claim 1, wherein when error occurred information is received from the first terminal unit, the at least one other terminal unit measures the reception power of the at least one base station.

7. The apparatus of claim 1, further comprising:
   a power measurement controller for selecting one of said terminal units for measuring the reception power of the at least one base station when the mobile communication terminal switches to an idle mode.

8. The apparatus of claim 7, wherein the power measurement controller selects a terminal unit for measuring the reception power of the at least one base station is based on electric field strengths of the at least two terminal units.

9. The apparatus of claim 4, wherein the controller comprises at least one processing unit that is in communication with at least one memory.

10. A method for managing reception power of at least one base station in a mobile communication terminal having at least two Subscriber Identity Module (SIM) cards operating in an idle mode, the method comprising:
    measuring reception power of the at least one base station using a first terminal unit associated with a first SIM card among at least two terminal units; and
    transmitting the reception power of the at least one base station measured by the first terminal unit to at least one other terminal units associated with at least one SIM cards that excludes the first SIM card.

11. The method of claim 10, further comprising, when switching to the idle mode, selecting a terminal unit for measuring the reception power of the at least one base station,
    wherein when the first terminal unit is selected, the reception power of the at least one base station is measured using the first terminal unit.

12. The method of claim 11, wherein the selecting of the terminal unit comprises:
    measuring electric field strengths of the at least two terminal units; and
    selecting the terminal unit for measuring the reception power of the at least one base station based on the measured electric field strengths.

13. The method of claim 11, further comprising:
    inactivating a terminal unit not selected for measuring the reception power among the at least two terminal units.

14. The method of claim 10, wherein the measuring of the reception power of the at least one base station comprises:
    measuring a reception power of a serving base station and at least one neighbor base station.

15. The method of claim 10, wherein the transmitting of the reception power comprises:
    periodically transmitting the measured reception power of the at least one base station to each of the at least one other terminal units.

16. The method of claim 10, wherein the transmitting of the reception power comprises:
    determining whether the reception power of the at least one base station measured by the first terminal unit has changed; and
    when the reception power of the base station has changed, transmitting the changed reception power of the at least one base station to the at least one other terminal units associated with the at least one SIM card.

17. The method of claim 10, further comprising, when an error occurs at the first terminal unit, measuring the reception power of the at least one base station using at least one terminal unit from among the at least one terminal units associated with the at least one SIM card.

18. The method of claim 17, further comprising, when an error occurs to the first terminal unit, selecting at least one terminal unit for measuring the reception power of the base station from the at least one terminal units associated with the at least one SIM card,
    wherein the reception power of the at least one base station is measured using the selected at least one terminal unit.

* * * * *